(12) United States Patent
Wiggs

(10) Patent No.: US 6,931,879 B1
(45) Date of Patent: Aug. 23, 2005

(54) CLOSED LOOP DIRECT EXPANSION HEATING AND COOLING SYSTEM WITH AUXILIARY REFRIGERANT PUMP

(76) Inventor: B. Ryland Wiggs, 214 Overlook Ct., Suite 160, Brentwood, TN (US) 37027

( * ) Notice: Subject to any disclaimer, the term of this patent is extended or adjusted under 35 U.S.C. 154(b) by 0 days.

(21) Appl. No.: 10/073,513

(22) Filed: Feb. 11, 2002

(51) Int. Cl.[7] .............................................. F25D 23/12
(52) U.S. Cl. .......................... 62/260; 62/324.1; 165/45
(58) Field of Search ............................... 62/260, 324.1, 62/160, 238.7, 196.1, DIG. 2; 165/65, 163, 165/184, 45

(56) References Cited

U.S. PATENT DOCUMENTS

| | | | |
|---|---|---|---|
| 4,325,228 A * | 4/1982 | Wolf ............................ | 62/260 |
| 4,383,419 A * | 5/1983 | Bottum ....................... | 62/238.6 |
| 4,448,238 A * | 5/1984 | Singleton et al. ............. | 165/45 |
| 4,993,483 A * | 2/1991 | Harris .......................... | 165/45 |
| 5,313,804 A * | 5/1994 | Kaye ............................ | 62/160 |
| 5,383,337 A * | 1/1995 | Baker ........................... | 62/121 |
| 5,461,876 A | 10/1995 | Dressler | |
| 5,623,986 A | 4/1997 | Wiggs | |
| 5,671,608 A | 9/1997 | Wiggs et al. | |
| 5,758,514 A * | 6/1998 | Genung et al. ................ | 62/471 |
| 5,816,314 A * | 10/1998 | Wiggs et al. .................. | 165/45 |
| 5,946,928 A | 9/1999 | Wiggs | |

\* cited by examiner

*Primary Examiner*—Melvin Jones
(74) *Attorney, Agent, or Firm*—Waddey & Patterson; Mark J. Patterson

(57) ABSTRACT

A direct expansion refrigerant-based heating and cooling system which includes a refrigerant pumping devise calibrated to ease or eliminate the pumping requirements placed upon the system's compressor unit when one or both of significant system height differentials between the compressor unit and the condensing unit are present and significant system refrigerant fluid transport line distances are present, or are desirable, such as in a deep well direct expansion system application.

21 Claims, 2 Drawing Sheets

Cooling Mode**

Heating Mode

CLOSED LOOP DIRECT EXPANSION HEATING AND COOLING SYSTEM WITH AUXILIARY REFRIGERANT PUMP

BACKGROUND OF THE INVENTION

The invention relates to the field of closed-loop, refrigerant-based, direct expansion, heating and cooling systems which encounter one or more of significant system component height differentials, particularly significant compressor and condenser height differentials, and significant system refrigerant fluid transport line distances. The invention is of particular advantage in direct expansion heating and cooling systems, wherein a refrigerant fluid, such as R-22, or the like, is circulated by a compressor through heat conductive tubing, typically copper tubing, located below ground, to acquire heat from the ground in the winter and to reject heat into the ground in the summer. This direct expansion system in-ground heat exchange system typically eliminates the need for the outdoor air heat exchange unit in a conventional air-source heat pump system, and eliminates the need for an open or a closed loop of circulating water in a conventional water source heat pump system, thereby increasing overall system operational efficiencies. Direct expansion systems are typically installed via a series of in-ground heat exchange tubes, buried about 4 to 6 feet deep in a horizontal array, or via an array of vertical or angled tubing buried about 50 to 100 feet deep. Generally, most in-ground heat exchange tubing is designed to be within a distance of about 50 to 100 feet from the compressor unit. The present invention utilized in a direct expansion system will permit deep well, beyond 50 to 100 feet, applications, and will additionally permit the location of in-ground heat exchange tubing to be located significant distances, beyond 50 to 100 feet, from the compressor unit.

A compressor is used in all direct expansion, refrigerant-based, heat transfer systems. The compressor takes an incoming heat-laden refrigerant vapor, from a larger sized refrigerant transport line, and compresses the vapor into a smaller sized refrigerant transport line, thereby condensing the existing heat into a smaller area and increasing the temperature of the refrigerant vapor. The heated refrigerant vapor is circulated, via force of the compressor, to a cooler heat exchange medium, termed the condenser, where heat is removed from the refrigerant. As the heat is removed, the cooled refrigerant condenses into a liquid state. The liquid refrigerant is then directed, via a liquid transport line, to an expansion valve, which, via expanding and lowering the pressure of the refrigerant, effectively causes the refrigerant to expand into a cooler mostly vapor state. The cooled vapor state refrigerant is transported, again by means of force of the compressor operation, via a line of larger diameter than the liquid line, and is circulated to a heat source area, termed the evaporator, to acquire heat which raises the temperature of the refrigerant vapor. The heated vaporized refrigerant, having acquired heat from the desired source, is pulled into the compressor by its suction operation, where the process is repeated. This provides an effective means of heat transfer.

Since compressors are primarily designed to act as compressors, even when there is a modest elevation differential, such as 10 to 25 feet, between the compressor and the condenser, such that a refrigerant liquid elevation load is placed on the compressor which is now required to perform increased pumping work, system operational efficiencies are noticeably impaired. Beyond 50 to 100 feet, system operational efficiencies are materially impaired. For example, via testing in a vertical in-ground heat exchange direct expansion refrigerant-based geothermal heating/cooling system, such as that described in B. Ryland Wiggs' U.S. Pat. No. 5,623,986, the disclosure of which is incorporated herein by reference, testing has shown that, when operating in the cooling mode, where the in-ground heat exchange coils are acting as the condenser, system operational efficiencies decrease as the depth of the in-ground heat exchanger increases. This is due to the increasing head pressure of the refrigerant liquid on its way up from an elevation materially lower than the compressor, as compressors are not designed to operate as liquid elevation pumps. The same is true in a horizontal application, such as that described in B. Ryland Wiggs U.S. Pat. No. 5,946,928, the disclosure of which is incorporated herein by reference, where the horizontal in-ground heat exchanger is at a depth materially below the compressor when operating in a cooling mode, or where the height of the in-ground heat exchanger is materially above the compressor when operating in a heating mode, such as where the in-ground system is on a hill above the system's compressor in the house.

Since most refrigerant heat pump systems do not operate under constant conditions, most utilize self-adjusting expansion valves in both the heating and the cooling modes. These valves operate at their peak efficiencies when they are close, generally within about two feet, to the heat exchange means operating as the evaporator, and the greater the distance, the lower their operational efficiency as these valves become more prone to hunting rather than to maintaining an optimum setting. While the primary object of the invention is to permit one or both of a deep well and an extended refrigerant line length in a direct expansion system application, placement of the refrigerant pump in the system's liquid line prior to the expansion valve will also assist in maintaining a preferable uniform refrigerant flow to the expansion valve.

Regarding refrigerant pumps, although some strictly cooling mode refrigerant systems utilize pumps to modestly increase the otherwise normal operational pressure of the liquid refrigerant flowing into the expansion valve primarily for the purpose of helping to suppress flash gas, the most common historical utilization of refrigerant pumps are for use in refrigerant recovery systems. These recovery systems are used to pump refrigerant out of a closed-loop system into a storage container so as to permit repairs or service to the system. Once the servicing is completed, the refrigerant is returned to the closed-loop system. This refrigerant recovery system inhibits the wasting of refrigerant fluids, and helps to protect the earth's ozone layer from certain refrigerants' harmful effects if they were simply released into the atmosphere.

SUMMARY OF THE INVENTION

It is an object of the invention to provide a means to overcome these elevation and distance differential operational efficiency impairments in a closed-loop, direct expansion, heating and cooling system by means of the insertion of a liquid fluid pump in the liquid refrigerant transport line, which liquid refrigerant line is always located after the condenser and before the expansion valve, which expansion valve is always located before, but typically in close proximity to, the evaporator, regardless of whether or not the system operates in a reverse cycle mode. In a reverse cycle mode, via simple refrigerant fluid directional valves and piping commonly understood in the industry, the heat source (evaporator) and the cooling source (condenser) can be reversed from a heating mode to a cooling mode by simply reversing the direction of the refrigerant fluid flow through the system, except for the direction of the vapor entering and exiting the compressor which direction is constant, thereby permitting only one system, operating with only one compressor, to provide heat to an interior space in the winter, and to provide cooling in the summer. Also, in a reverse cycle direct expansion system, it is common to utilize a receiver so as to permit automatic refrigerant fluid level adjustments when switching from the heating to the cooling mode or visa versa, as well as an accumulator to catch any remaining liquid refrigerant before it enters the vapor compressor unit. As these and other devices are commonly used and well known in the trade, only the accumulator and other basic elements are shown in the following drawings, together with the refrigerant pump application, which pump application is the subject of this invention.

Since a vapor always fills the available space within the refrigerant vapor transport line, and therefore does not exert significant head pressure, the fluid pump is primarily needed in the cooling mode when the condenser is below the compressor elevation, and is primarily needed in the heating mode where the evaporator is above the compressor elevation, so that the fluid pump is able to offset the head pressure of lifting the fluid refrigerant against the force of gravity.

The liquid refrigerant fluid pump will be sized to offset the head pressure of the liquid state refrigerant in the liquid line, depending on the volume, weight, depth or height, of fluid in the liquid line, as well as taking other factors into account, such as the system operating pressures, the refrigerant transport tubing's interior wall resistance, the overall refrigerant fluid volume, and the like, which factors and calculations are readily understood by those in the field. This will enable the compressor to operate at its maximum design efficiency as a compressor, and will further enable direct-expansion, refrigerant-based, geothermal heating and cooling systems, whether operating in a single heating or cooling mode or in a reverse-cycle mode, to efficiently operate with the in-ground heat exchange lines installed at any depth, or at any elevation, or at any distance, desired. Liquid pumps operate very efficiently with minimal power requirements. Refrigerant compressors operate very efficiently as compressors when they are not required to additionally provide pumping power, for which pumping purposes they were not primarily designed. Consequently, the invention enables maximum efficiencies to be achieved when significant elevation differentials are desirable between the compressor and the condenser, such as when the in-ground heat exchange tubing is installed in a deep well direct expansion geothermal system operating in a cooling mode.

An additional reason for utilization of a refrigerant fluid pump would be when one or both of the condenser and the evaporator are located a significant distance, for example plus or minus 100 feet, from the compressor, even if the system's component's height differentials were negligible. All refrigerant transport lines generate interior line friction and resistance as the refrigerant fluid is moved by the compressor through the interior of the system's refrigerant transport line tubing, since the refrigerant fluid encounters resistance from the interior surface area of the transport line tubing. As refrigerant line distances increase, this interior tubing surface area resistance factor, coupled with the necessary proportionate increased volume of refrigerant fluid to be moved within the closed-loop system, also places additional pumping requirements on the compressor. Thus, the subject fluid pump can also be utilized when extended refrigerant fluid transport line distances are desirable, with the said resistance factors being calculated to determine the appropriate fluid pump size, thereby similarly enabling the compressor to act as a compressor at its peak design efficiency.

Another advantage of utilizing a fluid pump in a direct expansion system would be to solve the common low-pressure start-up problem when the system is operating in the cooling mode. Since refrigerant fluid naturally migrates to the coolest point in the system, at the beginning of the cooling season, when the ground is operating as the condenser in a direct expansion geothermal heat pump system, the ground surrounding the condensing lines has supplied heat throughout the winter and is usually the coldest point. As a result, when the system has satisfied the interior air temperature requirements and shuts off, a significant portion of the refrigerant fluid migrates to the cold ground condensing lines and remains there in a liquid state. Consequently, the refrigerant in a vapor state is depleted, often causing the compressor to automatically shut down via its own internal low-pressure safety cut-off design. To overcome this problem, various geothermal direct expansion system designs, such as William E. Dressler U.S. Pat. No. 5,461,876 incorporate a re-programming of the compressor to continue to operate, or to continue to periodically repeat the start-up mode until enough refrigerant is moved into the evaporator to commence normal system operation. This re-programming of the compressor reduces the compressor life and consumes large amounts of energy, thereby reducing overall system efficiencies. By programming the fluid pump to start prior to the compressor, as is readily understood by those skilled in the trade, so as to equalize or to approximately equalize refrigerant pressures on both sides of the compressor unit, the necessity to re-program the compressor to continuously repeat start-up attempts under low pressure conditions is eliminated.

An additional advantage of the utilization of a liquid pump in a direct expansion system would be to eliminate the potential for problems caused by a significant pressure differential in the system immediately after system shut-down. Dressier, in his said patent, addresses this problem by incorporating a bleeder port in the regulating device. However, such a bleeder port detracts from system operational efficiencies. Via appropriate utilization of a liquid pump programmed to equalize pressure on both sides of the compressor prior to system start-up, it would not be necessary to drill a bleeder hole in the regulating devise (not shown in drawings). Utilization of a liquid pump will also eliminate the necessity for a refrigerant pump-down mode into an oversized receiver, subsequent to system shut down, as utilized in some refrigerant systems such as taught in U.S. Pat. No. 5,671,608 to Wiggs, et al., the disclosure of which is incorporated herein by reference.

When operating in a mode where the liquid refrigerant must be pumped up from an elevation materially below that of the compressor, such as in a deep well application beyond 50 to 100 feet deep, a well-known oil separator should be attached to the compressor so as to prevent loss of internal compressor lubricating oil in the low elevation liquid line. Other customary direct expansion refrigerant system apparatus and materials would be utilized, including an appropriately sized receiver and accumulator, for example as described in U.S. Pat. No. 5,946,928 to Wiggs, all of which are well-known to those in the trade.

Various types of fluid pumps may be used. A preferable fluid pump would be a self-priming, reversible, variable speed pump, which would be located above-ground at the top of a deep geothermal liquid line, when the system operates in the cooling mode. This same pump could be utilized in a reverse direction and at another appropriate operational speed, to offset the resistance friction caused by the length of the interior refrigerant transport lines when the refrigerant fluid is flowing in the reverse direction in the heating mode, so long as the pump is located at a point in the liquid refrigerant transport line between each of the two expansion valves. Either a single such multi-purpose pump could be utilized, or as an alternative, the liquid line at this common point could be divided into two or more lines, with the multiple lines having separate respective single direction pumps of varying power each, programmed to respectively engage as necessary, with additional such pumps positioned to operate in the opposite direction by means of an array of multiple lines and one-directional valving well understood by those in the trade, depending on the primary refrigerant flow direction desired in either the heating or the cooling mode.

Another simple type of refrigerant pump would be a submersible, reversible, variable speed, fluid pump, which is located at or near the bottom of the liquid line. Since the line at this point will be filled with outgoing liquid refrigerant in the cooling mode, and with incoming liquid refrigerant in the heating mode, the pump would not have to be self-priming. The pump would operate at full power in the cooling mode, so as to pump the liquid refrigerant up to the evaporator, and would operate at a lesser appropriate power in the heating mode, so as to assist in overcooling interior line friction via both pulling the liquid refrigerant through the condenser and, as a result, effectively pushing the refrigerant vapor, which could also potentially contain some un-vaporized liquid, up to the evaporator. The pump would not have to operate in reverse directions if the particular system was designed to operate in only a heating mode only, or in a cooling mode only. Such a refrigerant pump is not known to be readily available, and would likely have to be specially manufactured. However, if the direct expansion heating or cooling system was designed to operate in only one mode, and a low point in the condensing segment was accessible, a Coro Valve Pump, or the like, could be utilized. A Coro Valve Pump is a positive displacement liquid refrigerant pump manufactured by Corkin, Inc., of P.O. Box 12338, Oklahoma City, Okla. 73157.

Absent a readily available submersible liquid refrigerant pump, an available Side Channel Pump, with an optional by-pass valve to prevent any vapor lock potential and to initiate self-priming, or the like, can be utilized for effective system operation. Although not typically reversible, Side Channel Pumps, such as those manufactured by Corkin, Inc., can be placed at an accessible above-ground location in the liquid line between the two expansion valves. Reverse direction refrigerant fluid flow through a Side Channel Pump is easily accomplished by means of one directional piping and valve by-passes, just as utilized for the compressor, as is well known and understood by those in the trade. Again, rather than require a variable speed Side Channel Pump for reversible system operation or other changing conditions, more than one such pump, of respective varying powers, can be placed in respective divided segments of the liquid refrigerant line, with one or more such pumps programmed to operate depending upon system requirements.

An alternative to utilizing a Side Channel Pump, or the like, would be to utilize a readily available, but oversized, scroll compressor, or the like, in its place, such as those scroll compressors manufactured by Scroll Technologies, of One Scroll Drive, Arkadelphia, Ark. 71923. Scroll compressors, well known to those skilled in the field, can effectively pump either refrigerant liquid or vapor. By over-sizing a standard scroll compressor so that the intake is expanded in size, but so that the discharge capacity and rate, after having calculated and added appropriate capacity for fluid head pressure and line resistance factors and the like, is equal or approximately equivalent to the intake design rate of the system's primary compressor unit, with the system's primary compressor unit's intake rate calculated absent any system liquid head or line resistance issues, and the like, taken into account, there will be either no or minimal compression work load expended by the scroll pumping unit, and the over-sized scroll compressor will, as a result, efficiently utilize its energy solely in a pumping capacity.

In another alternative, the scroll compressor, designed to compress a refrigerant vapor, can be easily modified by the factory to a non-compression scroll design, as would be readily understood by those in the trade, so as to avoid the necessity to oversize the scroll unit when solely utilized in a pumping capacity. The same applications and the same factory modification, as described for a scroll compressor unit, can be applied to a screw compressor unit, such as those manufactured by York International, of 631 South Richland Avenue, York, Pa. 17403, or to any other appropriately designed compressor unit capable of pumping both vapor and liquid state refrigerant.

In a materially deep direct expansion heat exchange tubing application, one or more pumps, consisting of positive displacement pumps, positive displacement pumps magnetically coupled to a drive motor, centrifugal pumps, vane pumps, or oversized or modified scroll compressor or screw compressor units, or the like, could be utilized on each of the supply line and the return line from the deep tubing application, so as to provide both an auxiliary push and an auxiliary pull, with each respective pumping unit designed to operate at an appropriate capacity and speed, depending on whether such respective unit was pumping liquid or vapor refrigerant.

The invention will have a particularly valuable application in any deep direct expansion in-ground heat exchange tubing application, where available land area is limited for installation of a more conventional horizontal in-ground heat exchange tubing array, and where an efficient vertical design is preferable, such as that as disclosed in U.S. Pat. No. 5,623,986 to Wiggs, as well as in any other appropriate application apparent to those skilled in the trade.

BRIEF DESCRIPTION OF THE DRAWINGS

There are shown in the drawings embodiments of the invention as presently preferred. It should be understood, however, that since auxiliary refrigerant fluid pumps, consisting of one or both of refrigerant liquid pumps and refrigerant vapor pumps, can be located at any number of sites on any particular direct expansion system design, the invention is not limited to the simple exemplary arrangements and instrumentalities shown in the drawings, wherein.

DESCRIPTION OF THE PREFERRED EMBODIMENTS

Figure 1:
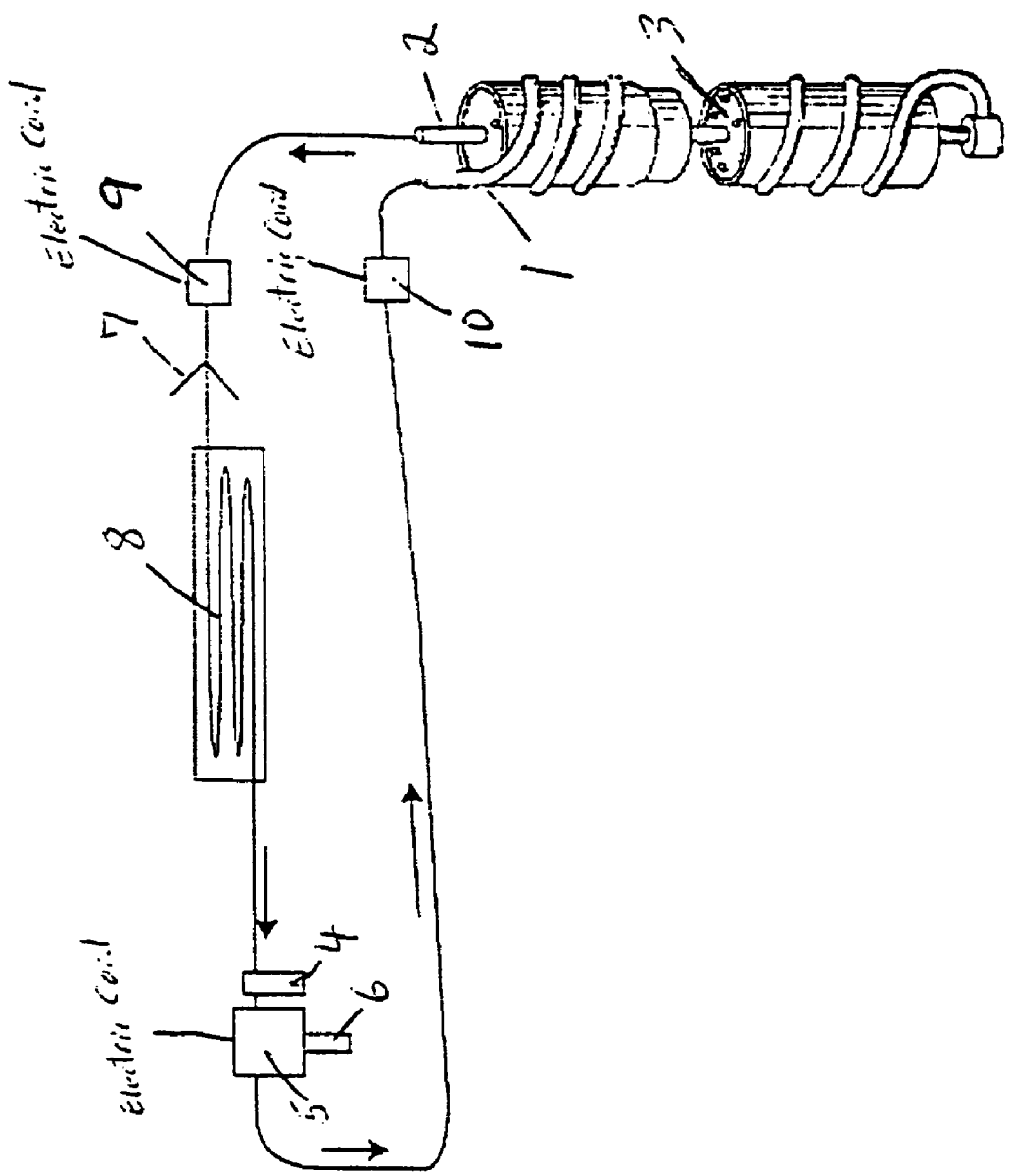
FIG. 1 is a schematic view of a direct expansion heat pump system, with a deep in-ground heat exchange line, operating in the cooling mode, together with an auxiliary refrigerant vapor pump and a second auxiliary refrigerant liquid pump.

FIG. 1 is a schematic view of an example direct expansion cooling system with a deep in-ground heat exchange supply line 1 and a correspondingly deep in-ground heat exchange insulated return line 2, with the return line surrounded by insulation 3, as more fully described in U.S. Pat. No. 5,623,986 to Wiggs. Additionally shown is an accumulator 4, a standard compressor unit 5 with an attached standard oil separator 6, a standard expansion valve 7 in close proximity to a particular system design standard interior air heat exchanger 8, with an auxiliary refrigerant vapor pump 10 connected to the in-ground heat exchanger supply line 1, and with an auxiliary refrigerant liquid pump 9 connected to the in-ground heat exchanger return line 2.

Figure 2:
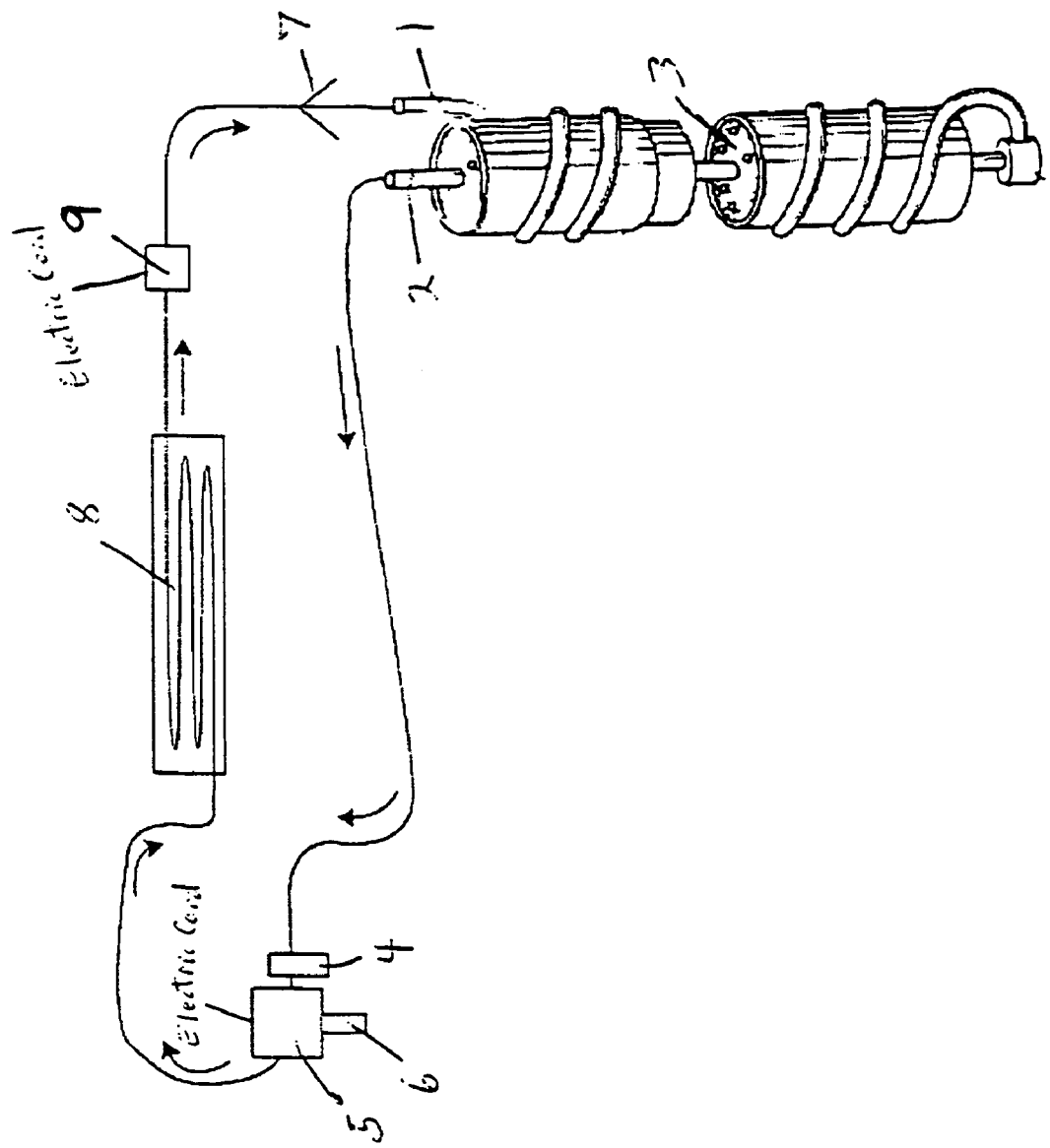
FIG. 2 is a schematic of a direct expansion heat pump system, with a deep in-ground heat exchange line, operating in the heating mode, together with an auxiliary refrigerant liquid pump.

FIG. 2 is a schematic view of an example direct expansion heating system with a deep in-ground heat exchange supply line 1 and a correspondingly deep in-ground heat exchange insulated return line 2, with the return line surrounded by insulation 3, as more fully described in U.S. Pat. No. 5,623,986 to Wiggs. Additionally shown is an accumulator 4, a standard compressor unit 5 with an attached standard oil separator 6, a particular system design standard interior air heat exchanger 8, a standard expansion valve 7 in close proximity to the in-ground heat exchange supply line 1, with an auxiliary refrigerant liquid pump 9 connected to the in-ground heat exchange supply line 1

Although particular embodiments of a system and method to enable direct expansion refrigerant heat pump systems to efficiently operate at significant system height differentials and with significant distances between system components by means of the use of one or more auxiliary refrigerant pumps, it is not intended that such description be construed as limiting the scope of this invention, except as set forth in the following claims:

What is claimed is:

1. A direct expansion, refrigerant-based, heat exchange system comprising a compressor, an interior heat exchanger, an in-ground heat exchanger, and a refrigerant line operatively connecting the compressor, the in-ground heat exchanger and the interior heat exchanger in a closed-loop configuration, and at least one auxiliary refrigerant pump operatively connected to the refrigerant line and operative to pump refrigerant fluid during a system closed-loop cycle.

2. A direct expansion, refrigerant-based, heat exchange system comprising a compressor, an interior heat exchanger, an in-ground heat exchanger, and a refrigerant line operatively connecting the compressor, the in-ground heat exchanger and the interior heat exchanger in a closed-loop configuration, and at least one auxiliary refrigerant pump operatively connected to the refrigerant line and operative to pump refrigerant fluid during a system closed-loop cycle; and the system having both a heating closed-loop cycle and a cooling closed-loop cycle, the system having at least one first auxiliary refrigerant pump and at least one second auxiliary refrigerant pump, the at least one first auxiliary refrigerant pump operative to pump refrigerant fluid during the heating closed-loop cycle and the at least one second auxiliary refrigerant pump operative to pump refrigerant fluid during the cooling closed-loop cycle.

3. A direct expansion, refrigerant-based, heat exchange system comprising a compressor, an interior heat exchanger, an in-ground heat exchanger, and a refrigerant line operatively connecting the compressor, the in-ground heat exchanger and the interior heat exchanger in a closed-loop configuration, and at least one auxiliary refrigerant pump operatively connected to the refrigerant line and operative to pump refrigerant fluid during a system closed-loop cycle; and wherein the auxiliary refrigerant pumps are adapted to offset system pressure differentials associated with refrigerant system head pressure and system pressure losses associated with the refrigerant line.

4. A direct expansion, refrigerant-based, heat exchange system comprising a compressor, an interior heat exchanger, an in-ground heat exchanger, and a refrigerant line operatively connecting the compressor, the in-ground heat exchanger and the interior heat exchanger in a closed-loop configuration, and at least one auxiliary refrigerant pump operatively connected to the refrigerant line and operative to pump refrigerant fluid during a system closed-loop cycle; and the system having a heating closed-loop cycle and a cooling closed-loop cycle, the system further comprising expansion valves connected in the refrigerant line and wherein the at least one auxiliary refrigerant pump is operatively connected in refrigerant line between the expansion valves.

5. The system of claim 1 wherein the at least one auxiliary refrigerant pump is selected from a group comprising a centrifugal pump, a positive displacement pump, a positive displacement pump magnetically coupled to a drive motor, a vane pump, and a side channel pump.

6. The system of claim 1 wherein the at least one auxiliary refrigerant pump comprises a scroll compressor.

7. The system of claim 1 wherein the at least one auxiliary refrigerant pump can be operated at variable speeds.

8. A direct expansion, refrigerant-based, heat exchange system comprising a compressor, an interior heat exchanger, an in-ground heat exchanger, and a refrigerant line operatively connecting the compressor, the in-ground heat exchanger and the interior heat exchanger in a closed-loop configuration, and at least one auxiliary refrigerant pump operatively connected to the refrigerant line and operative to pump refrigerant fluid during a system closed-loop cycle; and wherein the at least one auxiliary refrigerant pump is reversible.

9. A direct expansion, refrigerant-based, heat exchange system comprising a compressor, an interior heat exchanger, an in-ground heat exchanger, and a refrigerant line operatively connecting the compressor, the in-ground heat exchanger and the interior heat exchanger in a closed-loop configuration, and at least one auxiliary refrigerant pump operatively connected to the refrigerant line and operative to pump refrigerant fluid during a system closed-loop cycle; and wherein the at least one auxiliary refrigerant pump is self-priming.

10. The system of claim 1, further comprising an oil separator connected to the compressor.

11. A direct expansion, refrigerant-based, heat exchange system comprising a compressor, an interior heat exchanger, an in-ground heat exchanger, and a refrigerant line operatively connecting the compressor, the in-ground heat exchanger and the interior heat exchanger in a closed-loop configuration, and at least one auxiliary refrigerant pump operatively connected to the refrigerant line and operative to pump refrigerant fluid during a system closed-loop cycle;

the system having both a heating closed-loop cycle and a cooling closed-loop cycle, the system having at least one first auxiliary refrigerant pump and at least one second auxiliary refrigerant pump, the at least one first auxiliary refrigerant pump operative to pump refrigerant fluid during the heating closed-loop cycle and the at least one second auxiliary refrigerant pump operative to pump refrigerant fluid during the cooling closed-loop cycle; and further comprising means to vary the operation of the at least one auxiliary refrigerant pump to equalize refrigerant fluid pressures on input and output sides of the compressor prior to compressor start-up.

12. In a closed loop, direct exchange heat exchange system, the system having a refrigerant transport line operatively positioned in the system after a condenser and before an expansion valve, and wherein the expansion valve is operatively positioned in the system before an evaporator, an improvement comprising an auxiliary refrigerant pump operatively connected to the refrigerant transport line.

13. A method of reducing the effects of pressure differentials and refrigerant line resistance factor losses in a closed loop, direct expansion refrigerant heat exchange system having a refrigerant fluid transport line comprising the step of adding an auxiliary refrigerant pump to the refrigerant fluid transport line.

14. The system of claim 1 wherein the in-ground heat exchanger is positioned in a deep well.

15. The system of claim 14 wherein the deep well is a dry well.

16. A direct expansion, refrigerant-based, heat exchange system comprising a compressor, an interior heat exchanger, an in-ground heat exchanger, and a refrigerant line operatively connecting the compressor, the in-ground heat exchanger and the interior heat exchanger in a closed-loop configuration, and at least one auxiliary refrigerant pump operatively connected to the refrigerant line and operative to pump refrigerant fluid during a system closed-loop cycle;

wherein the in-ground heat exchanger is positioned in a situated in a deep well; and wherein the deep well is a wet well.

17. The system of claim 14 wherein the deep well is partially dry and partially wet.

18. A direct expansion, refrigerant-based, heat exchange system comprising a compressor, an interior heat exchanger, an in-water heat exchanger, and a refrigerant line operatively connecting the compressor, the in-water heat exchanger and the interior heat exchanger in a closed-loop configuration, and at least one auxiliary refrigerant pump operatively connected to the refrigerant line and operative to pump refrigerant fluid during a system closed-loop cycle.

19. The system of claim 18, the system having both a heating closed-loop cycle and a cooling closed-loop cycle, the system having at least one first auxiliary refrigerant pump and at least one second auxiliary refrigerant pump, the at least one first auxiliary refrigerant pump operative to pump refrigerant fluid during the heating closed-loop cycle and the at least one second auxiliary refrigerant pump operative to pump refrigerant fluid during the cooling closed-loop cycle.

20. The system of either claim 18 or claim 19 wherein the auxiliary refrigerant pumps are adapted to offset system pressure differentials associated with refrigerant system head pressure and system pressure losses associated with the refrigerant line.

21. A direct expansion, refrigerant-based, heat exchange system comprising a compressor, an interior heat exchanger, an in-ground heat exchanger, and a refrigerant line operatively connecting the compressor, the in-ground heat exchanger and the interior heat exchanger in a closed-loop configuration, and at least one auxiliary refrigerant pump operatively connected to the refrigerant line and operative to pump refrigerant fluid during a system closed-loop cycle;

the system having both a heating closed-loop cycle and a cooling closed-loop cycle, the system having at least one first auxiliary refrigerant pump and at least one second auxiliary refrigerant pump, the at least one first auxiliary refrigerant pump operative to pump refrigerant fluid during the heating closed-loop cycle and the at least one second auxiliary refrigerant pump operative to pump refrigerant fluid during the cooling closed-loop cycle; and wherein the auxiliary refrigerant pumps are adapted to offset system pressure differentials associated with refrigerant system head pressure and system pressure losses associated with the refrigerant line.

\* \* \* \* \*